Oct. 12, 1965 F. JONKER 3,211,072

GEOMETRIC PRINT-OUT FOR SUPERIMPOSABLE CARD SYSTEMS

Filed March 14, 1961

INVENTOR

FREDERICK JONKER

BY Homer R. Montague

ATTORNEY

United States Patent Office 3,211,072
Patented Oct. 12, 1965

3,211,072

GEOMETRIC PRINT-OUT FOR SUPERIMPOSABLE CARD SYSTEMS

Frederick Jonker, Washington, D.C., assignor to Jonker Business Machines, Inc., a corporation of Delaware Filed Mar. 14, 1961, Ser. No. 95,621
2 Claims. (Cl. 95—73)

This invention pertains to information retrieval systems based on the use of superimposable cards dedicated to terms and the determination of coincidence of holes in said cards. These systems are also known as Peekaboo systems, and commercially they are marketed under the name "Termatrex."

In such systems, an item of information is prepared for entry into the system by first indexing it by a number of terms taken from a vocabulary of terms. Each item of information is given an accession number.

The system comprises a number of cards, each dedicated to a term. There will generally be a vocabulary of between 500 and 5000 terms. Generally, but not necessarily, on each termcard there is one place dedicated to a document in the collection. Each document has the same position dedicated to it on each termcard.

Items of information are entered into the system by selecting all of the termcards by which that item has been indexed, placing these cards in superimposition in a machine and drilling a hole in all of these cards simultaneously at the position dedicated to that item of information.

The system is searched by selecting a number of termcards together describing a search question, and placing these in superimposition in a viewing machine. Next, a light in the bottom of the viewing machine is turned on. The coinciding holes in these termcards are then visible as light dots. The serial numbers of these light dots can then be read off one by one, for example, by means of a transparent grid with an $x$–$y$ coordinate system on it.

This read-out is a laborious process as the results have to be written down on a piece of paper. The invention provides, therefore, for geometric printing-out of the search results by means of photography, and in such a manner that they can be utilized much more readily than a conventional arithmetic read-out.

The manner in which this can be accomplished will be discussed with reference to the following figures.

It would, of course, be possible to provide a permanent record of the search results by taking light sensitive paper with a coordinate read-out grid printed on it, and expose this by the light coming through coinciding holes. However, this sort of paper expands and contracts under changing humidity, to a degree that causes intolerable inaccuracies in the print-out. Therefore, the invention provides for the exposure of light sensitve paper simultaneously to the coinciding holes, and to a read-out grid.

Moreover, it will thus be possible for each individual user to mark up his own read-out grid with the location of the actual documents. Thus the print-out can become a record of the search, as well as a map to guide the searcher to the location of the actual documents located by the search.

Figure 1:
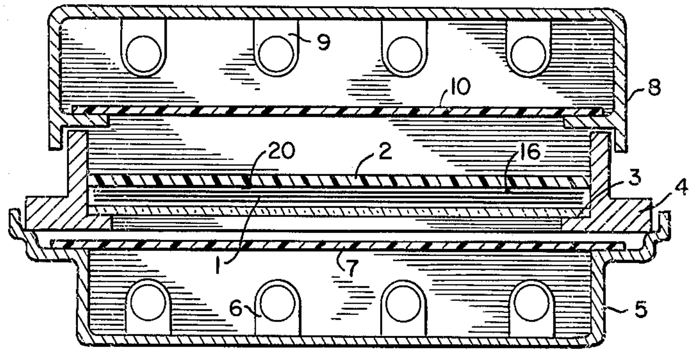
FIG. 1 shows a cross section of the print-out device.

The print-out device shown in FIG. 1 comprises in the first place the cardholder 4, in which the cards 1 are placed on top of a transparent support plate 3. On top of this is placed the read-out grid 2 shown in the plan view of FIG. 2. The termcards have a substantially rectangular shape similar to the shape of the read-out grid shown in FIG. 2, and the inside of the cardholder 4, the read-out grid 2, and the support plate 3 all have the same identical shape, so that all of these pieces will fit accurately in the cardholder.

The cardholder 4 is removably mounted on a lightbox comprising a light-source, for example a bank of fluorescent tubes 6, and a diffuser plate 7. Removably mounted on top of cardholder 4 is a second lightbox 8 comprising a source of light, for example fluorescent tubes 9, and a diffuser screen 10.

To make a permanent record of the search results, a piece of light sensitive paper 20 is placed on top of the cards 1. It is exposed to light coming through coinciding holes, from the light source in the bottom of the device, as well as to the light coming from a lightbox 8 placed on top of the cardholder, which exposes an image of the read-out grid 2 to the light-sensitive paper.

Depending on which side of the paper carries the light-sensitive coating, either the holes or the grid will be exposed through the paper, so that a fairly transparent paper will be required.

Figure 2:
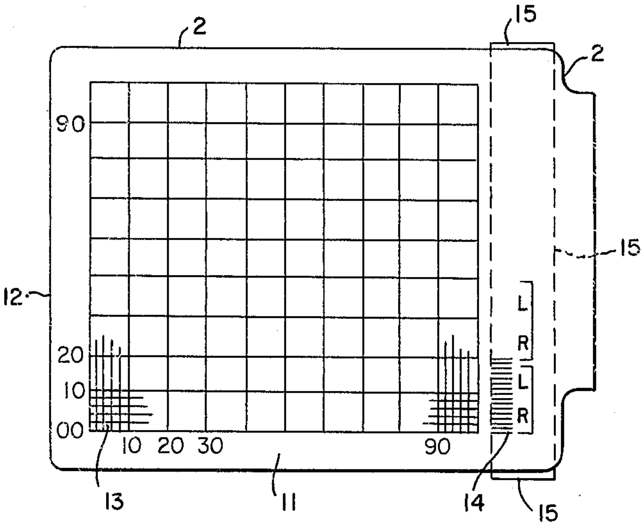
FIG. 2 shows the read-out grid.

FIG. 2 shows a top view of the read-out gird 2. Printed on the side that faces the lightsensitive paper is a coordinate system 13, having, for example, numbers printed along the $x$-axis 12 and $y$-axis 11, which enables the user to read exactly the coordinates of each of, for example, 10,000 positions. If the coordinates are $y$-axis 25, $x$-axis 37, the document number is, for example, 2537.

In the case of FIG. 2 each coordinate has 100 positions. Each horizontal row of positions, therefore, represents 100 documents. Documents can be numbered in groups of 100. It is then possible to mark at 14, which group of 100 the document belongs to, and in what drawer it is stored. It can also be marked to show in what cabinet this drawer is, and where the cabinet is placed. Thus to find a document it will be necessary to read out the position along the $x$-axis and read the location marked at the end of that row. A typical read-out could, for example, be #78, G17, D3, LC5, RM6 meaning document 78 in group 17, drawer 3, left hand side of cabinet 5, in room 6.

These markings are actually not on the read-out grid 2 itself, but on a strip of transparent material 15, removably attached to part 2, for example, by mounting it in a narrow slot 16 in FIG. 1.

In this way a print-out of the search results can be rapidly made which forms a permanent record and guides the user directly to the document. This represents a tremendous step forward as compared with the alternative, namely, an arithmetic print-out of the full numbers, which would involve complex and expensive scanning equipment driving an expensive typewriter-type printer. The printed list still would not give the locations of the documents.

Cardholder 4 is removable from lightbox 5 so that lightbox 5 as well as lightbox 8 could also be used for general office copying purposes. Instead of having a removable lightbox 8, it is also possible to mount a fixed light source at a distance above lightbox 4.

Superimposable card systems having more than one position dedicated to a document are also possible. The invention also applies to these. The figures and specifications above describe only one particular embodiment of the invention. However, the invention encompasses all different embodiments that fall within the claims.

What is claimed is:

1. Apparatus for preparing a composite photographic read-out record of the relative locations of optically differentiable markings established by a record sheet bearing such markings as predetermined positions on said record sheet, comprising:

(a) a light-transmitting grid plate having a photographically reproducible geometrical pattern providing an accurately dimensioned read-out pattern corresponding to the possible predetermined marking positions of said record sheet, said grid plate including means for removably securing thereon an auxiliary pattern-forming transparency lying in a marginal part of said grid plate, (b) position-locating frame means adapted to receive and to secure in superposed, registered relation (1) said grid plate, (2) a sheet of light-transmitting photographically sensitive material, and (3) such a record sheet, in that order, and (c) light sources disposed on opposite sides of the assembly of superposed and registered components of (b) for simultaneously exposing said sensitive material, on both of its surfaces, to the respective light patterns established by said grid plate and said record sheet, (d) whereby subsequent processing and handling of the read-out record thus provided by said sensitive material will not alter the geometrical conformity of the pattern produced by said grid plate with respect to the marking pattern produced by said record sheet.

2. The method of preparing a composite photographic read-out record of the relative locations of optically differentiable markings established by the superposition in registry of record sheets bearing such markings at predetermined positions of an established geometrical array on each of such record sheets, comprising the steps of:

(a) superposing in registered positional relation a sheet of light-transmitting photographically sensitive material and a plurality of such marked record sheets to form a stacked assembly of such components, with said sensitive material constituting a first major face of said assembly, (b) exposing the second major face of said assembly to a uniform beam of exposure illumination to record in said sensitive material an image corresponding to the markings on said record sheets; and (c) exposing the first major face of said assembly to a grid pattern of exposure illumination corresponding to said geometrical array to additionally record in said sensitive material an image corresponding to the relative positions of all of the significant marking positions of said record sheets corresponding to said array, (d) whereby the relative positions of said images as recorded in said sensitive material are geometrically independent of distortions of said sensitive material occurring after completion of said exposing operations.

References Cited by the Examiner

UNITED STATES PATENTS

| | | | |
|---|---|---|---|
| 1,165,465 | 12/15 | Taylor | 88—14 |
| 1,351,692 | 8/20 | Soper | 88—14 |
| 2,203,000 | 6/40 | Smith | 95—4.5 |
| 2,720,146 | 10/55 | Mears | 95—73 |
| 2,813,468 | 11/57 | Jones | 95—1 |

NORTON ANSHER, *Primary Examiner.*

JOHN M. HORAN, *Examiner.*